United States Patent
Nozato

(10) Patent No.: US 7,436,552 B2
(45) Date of Patent: Oct. 14, 2008

(54) INFORMATION PROCESSING APPARATUS, INFORMATION PROCESSING METHOD, AND CONTROL PROGRAM

(75) Inventor: Kiji Nozato, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1086 days.

(21) Appl. No.: 10/718,386

(22) Filed: Nov. 19, 2003

(65) Prior Publication Data
US 2004/0130743 A1 Jul. 8, 2004

(30) Foreign Application Priority Data
Nov. 27, 2002 (JP) .............................. 2002-343368

(51) Int. Cl.
| H04N 1/333 | (2006.01) |
| G06F 15/82 | (2006.01) |
| G06F 15/78 | (2006.01) |
| G06F 17/30 | (2006.01) |
| G06F 7/04 | (2006.01) |
| G06F 15/16 | (2006.01) |
| H04L 9/32 | (2006.01) |
| G06K 15/02 | (2006.01) |
| G06F 3/12 | (2006.01) |
| G06F 7/38 | (2006.01) |

(52) U.S. Cl. .................. 358/406; 358/1.1; 358/1.15; 358/1.14; 358/1.13

(58) Field of Classification Search .................. None
See application file for complete search history.

(56) References Cited

U.S. PATENT DOCUMENTS 6,498,912 B1 * 12/2002 Leni et al. ..................... 399/79

FOREIGN PATENT DOCUMENTS

| EP | 1197844 A2 * | 4/2002 |
| JP | H08-36470 A | 2/1996 |
| JP | 2001282475 A * | 10/2001 |
| JP | 2003280860 A * | 10/2003 |
| JP | 2003308185 A * | 10/2003 |
| JP | 2004178249 A * | 6/2004 |

* cited by examiner

*Primary Examiner*—Twyler L. Haskins
*Assistant Examiner*—Myles D Robinson
(74) *Attorney, Agent, or Firm*—Canon U.S.A., Inc., IP Division

(57) ABSTRACT

An information processing method for managing the usage of an image processing apparatus. The image processing method includes a managing step for managing log information that indicates the usage of the image processing apparatus; a registering step for registering image-processing-apparatus user information concerning an image-processing-apparatus user in the log information managed in the managing step; a first acquiring step for acquiring a limit value of an amount used that is input in response to the registration of the image-processing-apparatus user information in the registering step; and a setting step for automatically setting the limit value acquired in the first acquiring step as a limit value of a usage fee for the image-processing-apparatus user.

11 Claims, 18 Drawing Sheets

FIG. 5
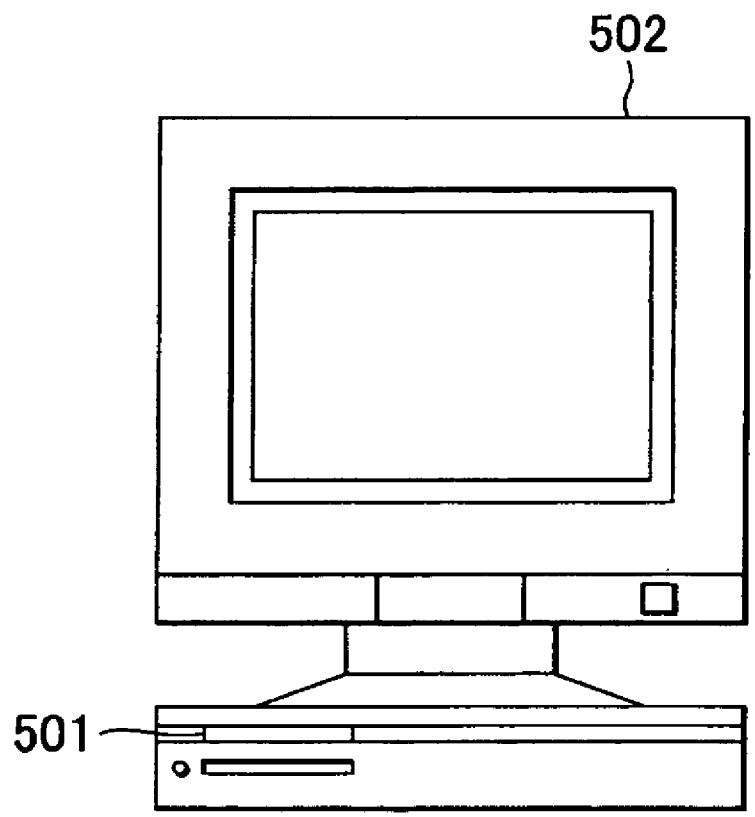
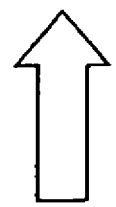
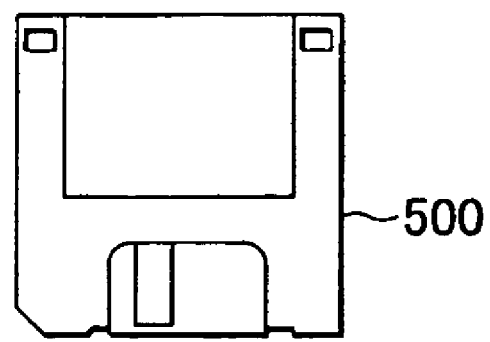

FIG. 9

| | |
|---|---|
| 901 — OUTPUT DEVICE | MFP-1 |
| 902 — METHOD FOR ACQUIRING JOB INFORMATION | USING JOB-HISTORY -KEEPING FUNCTION |
| 903 — TIME | 1999/11/01 pm5 GMT |
| 904 — KIND OF SHEET | OHP |
| 905 — THE NUMBER OF PAGES | 7 |
| 906 — THE NUMBER OF COPIES | 4 |
| 907 — IS JOB SUPPLIED TO SHARED PRINTER | NO |
| 908 — THE NAME OF USER WHO HAS ISSUED JOB | JOHN SMITH |
| 909 — MODE | COLOR |

FIG. 12
 USER FOLDER
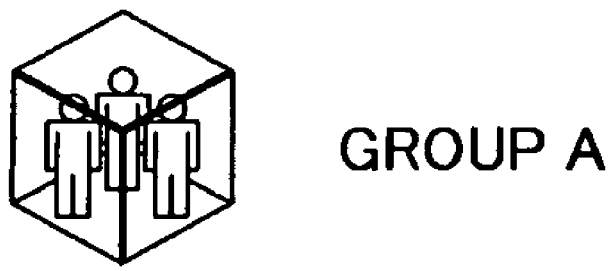 GROUP A
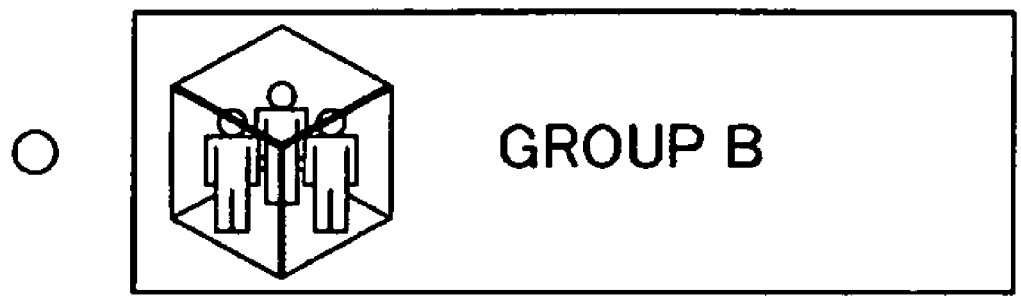 GROUP B
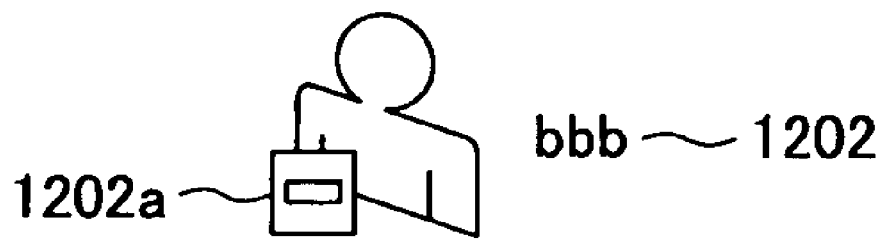 bbb ～1202
1202a
 aaa ～1201

FIG. 13

| Register/Edit User Information | ☒ |

User ID :

User name :

E-mail address :

Security level :  General user ▼

Set password

---

Windows user name :  bbb

---

OK    CANCEL

Warning : Applet window

INFORMATION PROCESSING APPARATUS, INFORMATION PROCESSING METHOD, AND CONTROL PROGRAM

BACKGROUND OF THE INVENTION

1. Field of the Invention

The present invention relates to an information processing apparatus, an information processing method, a control program, and a storage medium.

2. Description of the Related Art

Conventionally, information processing apparatuses are known for managing the usage of image processing apparatuses, such as printers, scanners, copiers, or multifunction printers (MFP) having the integrated functions of printers, scanners and copiers.

However, with the known image processing apparatuses described above, a manager must register information in advance concerning users to be managed, thus requiring a high load for operation.

When accounts have been manually or automatically set for users, a print limit value for every user, which is an example of user information, must be appropriately set. Hence, in known systems, limitations can be imposed on printing only after the manager sets an upper limit or the like, which is undesirable for security.

Furthermore, when system user information registered in a system or system group information is managed separately from information concerning an image-processing-apparatus user or an image-processing-apparatus user group, if a user or group that has newly joined a network has performed printing, there is no method for recognizing the image-processing-apparatus user or that the image-processing-apparatus user has joined the network before the image-processing-apparatus user information has been registered in a job account system.

SUMMARY OF THE INVENTION

It is a feature of the present invention to relieve the burden of registering user information in an image processing apparatus.

It is another feature of the present invention to automatically set the print limit value for a registered user in order to improve the security level of a printing system.

The present invention is embodied by the following means in order to achieve at least one of the above features.

The present invention provides, in its first aspect, an information processing apparatus for managing the usage of an image processing apparatus. The information processing apparatus includes a managing unit for managing log information that indicates the usage of the image processing apparatus; a registering unit for registering image-processing-apparatus user information concerning an image-processing-apparatus user in the log information managed by the managing unit; a first acquiring unit for acquiring a limit value of an amount used that is input in response to the registration of the image-processing-apparatus user information by the registering unit; and a setting unit for automatically setting the limit value acquired by the first acquiring unit as a limit value of a usage fee for the image-processing-apparatus user. The present invention also provides a system including the information processing apparatus, a method that can be applied to the system and the information processing apparatus, and a control program.

According to one aspect of the embodiments, it is possible to relieve the burden of registering user information in an image processing apparatus.

According to another aspect of the embodiments, it is possible to automatically set the print limit value for a registered user in order to improve the security level of a printing system.

Further objects, features and advantages of the present invention will become apparent from the following description of the preferred embodiments with reference to the attached drawings.

BRIEF DESCRIPTION OF THE DRAWINGS

FIG. 5 is a diagram illustrating a method for supplying the job-account-server application program and the relevant data in FIG. 4 to a computer.

FIG. 9 is an example of the job information registered in the job-history database, in the job account system according to the embodiment of the present invention.

FIG. 12 illustrates a screen that displays user information.

FIG. 13 illustrates a screen example for registering the user information.

DESCRIPTION OF THE PREFERRED EMBODIMENTS

Preferred embodiments of the present invention will be described in detail below with reference to the attached drawings. However, the scope of the present invention is not limited to the relative arrangement of components, display screens, and so on described in the embodiments, unless otherwise specified.

An embodiment of the present invention will now be described in detail with reference to the attached drawings.

<Job Account System>

Figure 1:
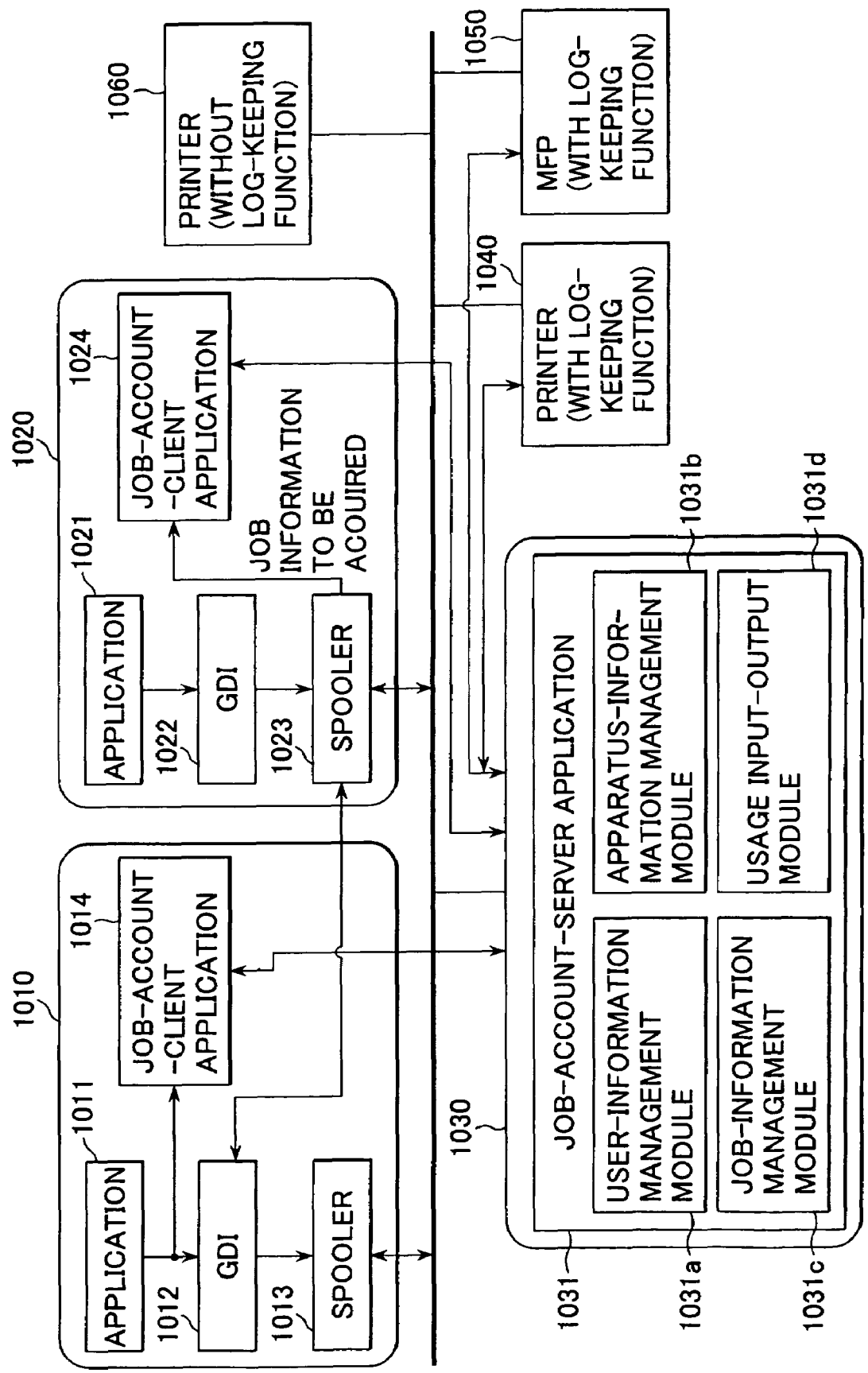
FIG. 1 is a block diagram showing the basic structure of a job account system according to an embodiment of the present invention.

FIG. 1 is a block diagram showing the basic structure of a job account system serving as a job management system of this embodiment. The job account system includes job-account client computers 1010 and 1020 and a job-account server computer 1030 serving as an information processing apparatus, which is a preferred embodiment of the present invention.

The job account system also includes a printer with a log-keeping function 1040 and a printer without the log-keeping function 1060. The printers 1040 and 1060 are examples of an image processing apparatus. The job account system further includes a multifunction printer (MFP) 1050 that has a printer function, a copier function, a scanner function, and the log-keeping function. Although a log kept in the printer 1040 and the MFP 1050 strictly differs from job information and is obtained by analyzing the job information to extract the necessary information for usage management, the concept of "job information" in the following description includes log information kept in these image processing apparatuses.

The job-account client computers 1010 and 1020, the job-account server computer 1030, the printers 1040 and 1060, and the MFP 1050 can communicate with each other via a network.

In the job-account client computer 1010, when an application 1011 invokes a graphics device interface (GDI) 1012, the GDI 1012 generates printing data in response to the instructions from the application 1011 and transmits the printing data to a spooler 1013. A job-account-client application 1014 monitors the invocation of the GDI 1012 by the application 1011 and stores the job information concerning the printing data generated by the GDI 1012. The job information includes the number of prints and the number of pages, the print size, the kind of sheet used, information concerning the user who has issued a print request (user information), and information concerning color printing (color information).

The spooler 1013 communicates with the printer 1040, the printer 1060, or the MFP 1050, which are examples of the image processing apparatus, via the network and transmits the printing data when the image processing apparatus is in a ready state. When the job-account client computer 1020 serves as a print server, the printing data is transmitted from the GDI 1012 to a spooler 1023.

The job-account-client application 1014 regularly transmits the stored job information to a job-account-server application 1031.

In the job-account client computer 1020, an application 1021, a GDI 1022, and the spooler 1023 function in the same manner as the application 1011, the GDI 1012, and the spooler 1013, respectively.

A job-account-client application 1024 regularly monitors the spooler 1023. When a print job is spooled in the spooler 1023, the job-account-client application 1024 acquires information concerning the print job with an application programming interface (API). Specifically, the job-account-client application 1024 acquires the number of output sheets and/or the number of pages in the print job. The job-account-client application 1024 then transmits the stored job information to the job-account-server application 1031.

If an operating system (OS) has a function for transmitting a change of state in the spooler 1023 to another application, the job-account-client application 1024 may not regularly monitor the spooler 1023. The OS should inform the job-account-client application 1024 that the print job has been spooled in the spooler 1023.

In the job-account server computer 1030, the job-account-server application 1031 includes a user-information management module 1031*a*, an apparatus-information management module 1031*b*, a job-information management module 1031*c*, and a usage input-output module 1031*d*.

The user-information management module 1031*a* stores the user information in a user information database (not shown) in the job-account server computer 1030 and manages the stored user information. The user information includes the name of a user who uses an image processing apparatus, a computer login name (the name input by the user for logging in a computer), a network login name (the name input by the user for logging in a network system), and a user ID or card information for using an apparatus. The user information is, for example, information identifying a user who uses an image processing apparatus and an upper limit for the user to use an apparatus.

According to the embodiment, there are three kinds of user registration. First, a user is registered at a system group, called a domain, which is controlled by the OS of an external server (not shown). The user registered at the domain (system user) can use network devices belonging to the domain within the scope of his/her authority. This is the first registration. The first registration information can be managed with a domain management system or a directory management system, such as a Microsoft OS. The first registration information may be managed by either a server on a network or an external management apparatus (external information processing apparatus).

However, generally, only access to an apparatus is limited in a domain. A print limit value indicating which network user (system user) can be allowed to print how many pages with which apparatus cannot be imposed on the user.

The authority to use resources in a device, such as the number of printable pages, is separately managed in a job-account server computer. Hence, image-processing-apparatus user information concerning a job account user, who is different from the system user registered in the external server, must be separately registered by an IT manager in the job-account server computer. This is the second registration.

The job-account server computer regularly acquires a log from a printer. For example, even a user who is not registered in the job-account server computer can perform printing with the printer, unless explicitly prohibited. In such a case, the job-account server computer can extract the ID of the unregistered user from the log to automatically and provisionally register the extracted ID in a job account server system. This is the third registration.

Figure 14:
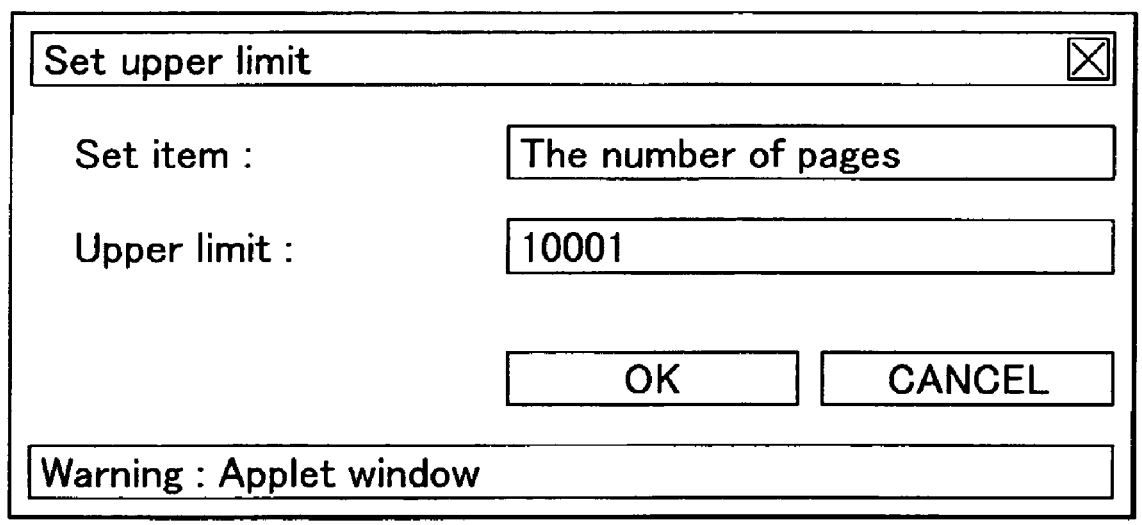
FIG. 14 illustrates another screen example for registering the user information.

The user information concerning the provisionally registered user is input by the manager into a dialog box shown in FIG. 13 or 14 to officially register the user. At this time, the user is authenticated as a registered user in the second meaning described above. The provisionally registered user may be called an unregistered user (in the second meaning) in the sense that the manager has not explicitly registered the user in the job-account server computer.

The user-information management module 1031a displays the stored user information and includes a user displaying program used by the manager for setting the user information. The user-information management module 1031a also includes an automatic registration program for confirming, for every job, whether the user who has issued the job is stored in the user information and for registering the user if he/she is not stored in the user information, based on a job history that is compiled by the job-information management module 1031c. The user-information management module 1031a further includes an upper-limit initial-value displaying program for displaying the initial value of an upper limit for the user to use an apparatus. The upper-limit initial-value displaying program is used by the manager for setting the initial value of an upper limit for the user.

The automatic registration includes a function for acquiring detailed information or part of the detailed information of the user who has issued the corresponding job via a network or from among other database information upon confirmation of the user information that is acquired based on the job history, and for registering the user information including the acquired detailed information. The automatic registration also includes a function for setting the set initial value of the upper limit as an upper limit for the corresponding user to use the apparatus.

The detailed information described above may be the user name that is stored in a network server or may be user information, such as a mail address, which is in an external user database.

In the user displaying program, the user is registered by the manager by user information that is to be displayed. The user displaying program displays the detailed user information or the upper limit for using the apparatus that is set and the detailed user information or the upper limit for using the apparatus that is only automatically registered by the automatic registration program in different manners in order for the manager to distinguish them. Since the user displaying program has a function for simply inputting the detailed user information or the upper limit for using the apparatus for the displayed user, the manager can instantly input the detailed information concerning the user who is automatically registered with the automatic registration program and for whom the detailed user information or the upper limit for using the apparatus has not been set.

Specifically, referring to FIG. 12, a user for whom detailed information is set and a user for whom the detailed information is not set are illustrated with different icons according to this embodiment. FIG. 12 is a screen displayed in a display of the job-account server computer. The registration user in the second meaning is distinguished from the registration user in the third meaning as illustrated in FIG. 12.

A user icon 1201 represents a user for whom detailed information is formally registered. A user icon 1202 with a minus icon 1202a represents a provisionally registered user for whom detailed information is not registered. Referring to FIG. 12, a user folder includes groups A and B. The group B includes users aaa and bbb.

When any of the user icons in FIG. 12 is clicked, a user-information registration dialog box as shown in FIG. 13 is displayed, where a user ID, a user name, an e-mail address, a security level, and so on can be set. Depressing a button for setting an upper limit for usage (not shown) displays an upper-limit setting dialog box in FIG. 14, where an upper limit for the user can be set.

The apparatus-information management module 1031b checks whether the image processing apparatus connected to the network has the log-keeping function, and stores the information concerning the apparatus that has the log-keeping function and other apparatuses in an apparatus information database (not shown) in the job-account server computer 1030 and manages the stored information. The apparatus information includes the print speed, the color information, and the network address of the image processing apparatus.

The job-information management module 1031c receives the job information from the job-account-client applications 1014 and 1024 and stores the received job information in a job-history database. The job-information management module 1031c requests the log information from the image processing apparatus having the log-keeping function (for example, the printer 1040) and acquires the log information through the usage input-output module 1031d. This processing may be regularly performed or may be performed when notifying the usage input-output module 1031d that the storage capacity in a log information storage unit (not shown) in the image processing apparatus runs short.

The usage input-output module 1031d outputs a usage report (a report indicating which user executes how many jobs) to the printer, which is an image processing apparatus, or to a display unit (not shown) in the job-account server computer 1030. Accordingly, the manager can acquire the usage of the image processing apparatus output from the usage input-output module 1031d. The usage input-output module 1031d outputs a variety of usage based on the user information, the apparatus information, and print history information that are stored in a memory. The manager specifies an output form for the usage input-output module 1031d. The output data concerning the usage may be transmitted to the job-account client computer 1010 or 1020 for displaying the usage in a display (not shown) in the job-account client computer 1010 or 1020.

The usage output includes the amount used for every user (the number of sheets or the amount of toner used for the output) and the time period during which the image processing apparatus is used. The usage is output by operation mode (function), such as color printing or two-sided printing, of the image processing apparatus. Or, the usage is output by the size or kind of sheets used.

Since the usage fee for the image processing apparatus is included in the apparatus information, the amount of the usage fee is output for every image processing apparatus or for every user. Furthermore, since the usage fee is set by the operation mode, the sheet size, and the kind of sheet, the amount of the usage fee is output based on which user prints out how many pages with which sheet in which operation mode and with which image processing apparatus.

The manager can set limit conditions for usage by function, by user, by user department, and by used apparatus with the user-information management module 1031a and the apparatus-information management module 1031b by executing a limit-condition setting program (not shown) included in the job-account-server application 1031. The limit conditions that can be set include items such as the usage fee, the number of pages, and the number of sheets. Such limit conditions are stored in the memory as part of the user information.

The job-information management module 1031c monitors the log of the image processing apparatus to compare the monitored log with the limit conditions for usage set by the manager. When the usage of a user reaches the limit conditions (for example, when execution of the received job information causes the number of sheets to be printed to exceed an upper limit), the use of the job-account client computer 1010 or the image processing apparatus by the corresponding user is refused.

<Control Structure of Computer>

Figure 2:
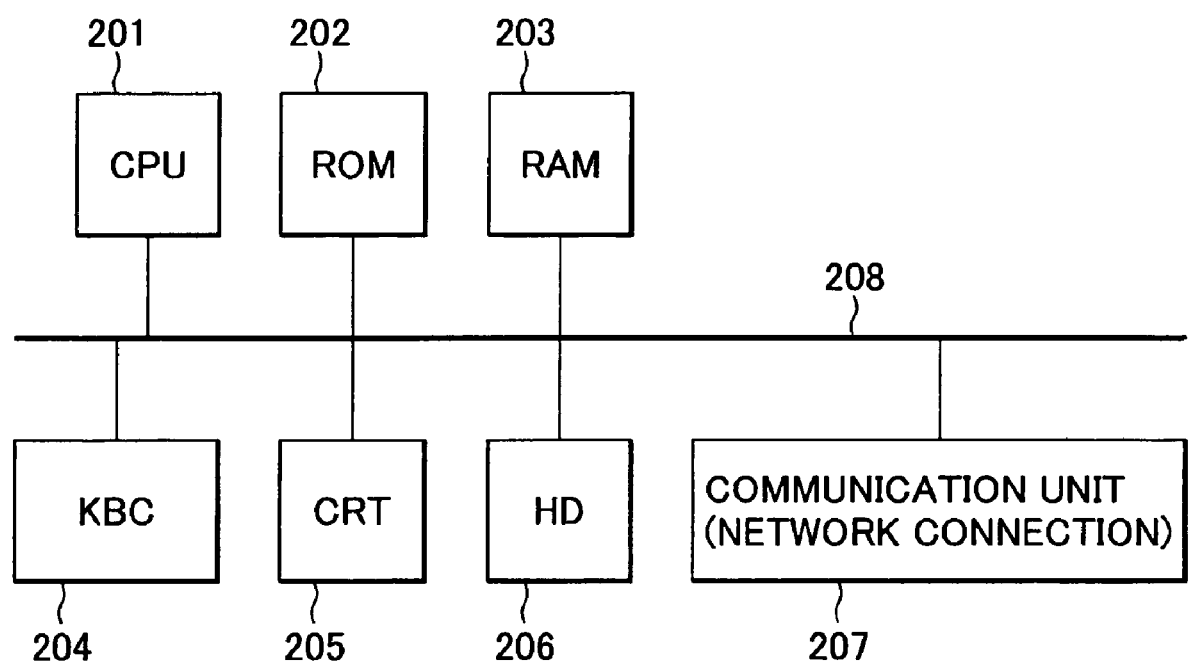
FIG. 2 is a block diagram schematically showing the structure of the computers included in the job account system according to the embodiment of the present invention.

FIG. 2 is a block diagram showing the hardware structure of the job-account client computer 1010, the job-account client computer 1020, and the job-account server computer 1030. A central processing unit (CPU) 201 controls the entire computer and performs arithmetic processing.

A read-only memory (ROM) 202 serves as a storage area where information such as a system invocation program is stored. A random access memory (RAM) 203 is a data storage area having no limit for use. An OS, an application program, a device driver (printer driver), a communication control program, and so on that are stored in the RAM 203 are executed by the CPU 201.

A keyboard controller (KBC) 204 receives input data from a keyboard attached to the computer and transmits the received data to the CPU 201. A cathode ray tube (CRT) (display controller) 205 performs display control for a display. A hard disk (HD) 206 can be replaced with an external memory device, such as a floppy disk (FD) or a static RAM (SRAM) (nonvolatile memory). The HD 206 stores programs and data, which are loaded into the RAM 203 if required. For example, the user information, the apparatus information, and the print history information (the job-history database) are stored in the HD in the job-account server computer 1030.

A communication unit 207 controls network communication. The computer can communicate with other computers or image processing apparatuses connected to a network through the communication unit 207.

Data is communicated between the above components through a system bus 208.

<Memory Map>

Figure 3:
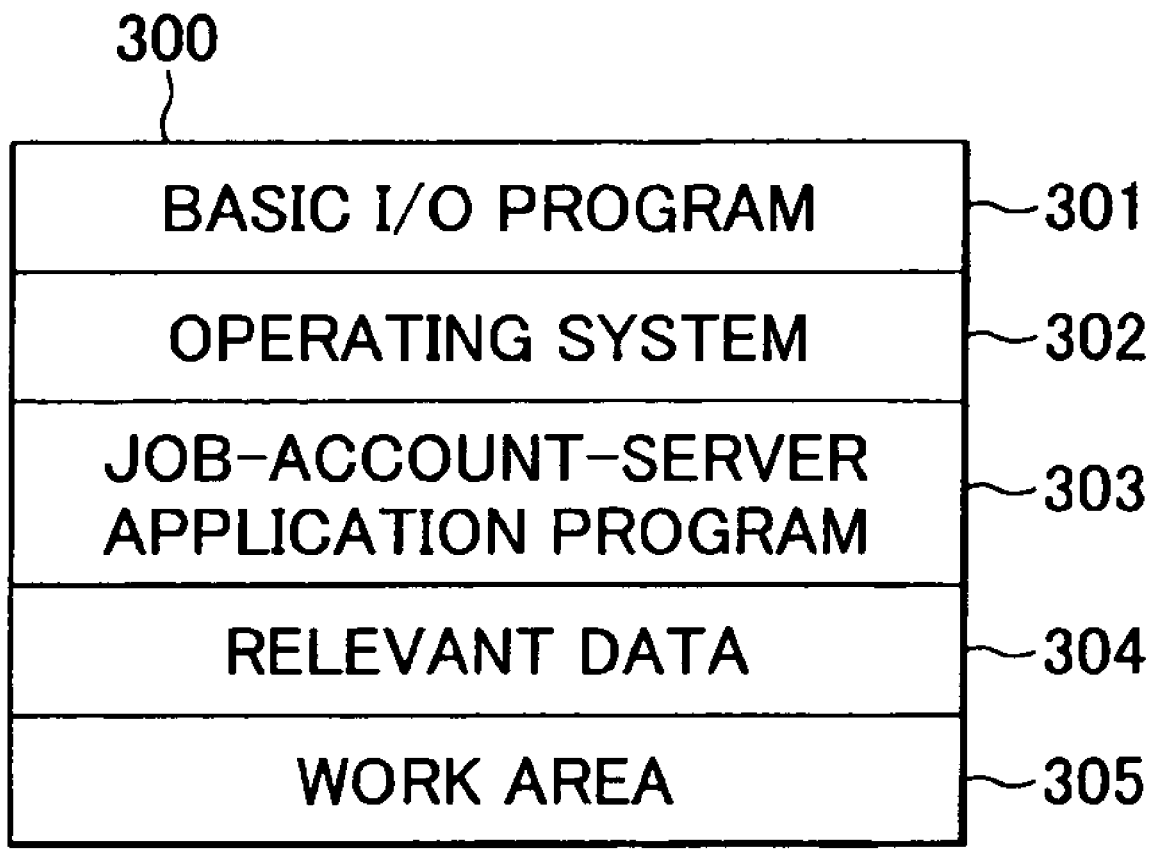
FIG. 3 illustrates a memory map in a state where a CPU can execute a job-account-server application program that is loaded into a RAM in the job account system according to the embodiment of the present invention.

FIG. 3 illustrates a memory map in a state where the CPU 201 can execute a job-account-server application program 303 that is loaded into the RAM 203. A basic I/O program 301, an operating system 302 such as a Windows® system, the job-account-server application program 303, relevant data 304, and a work area 305 are illustrated in the memory map. The work area 305 is used by the CPU 201 for executing a program such as the job-account-server application program 303.

Figure 4:
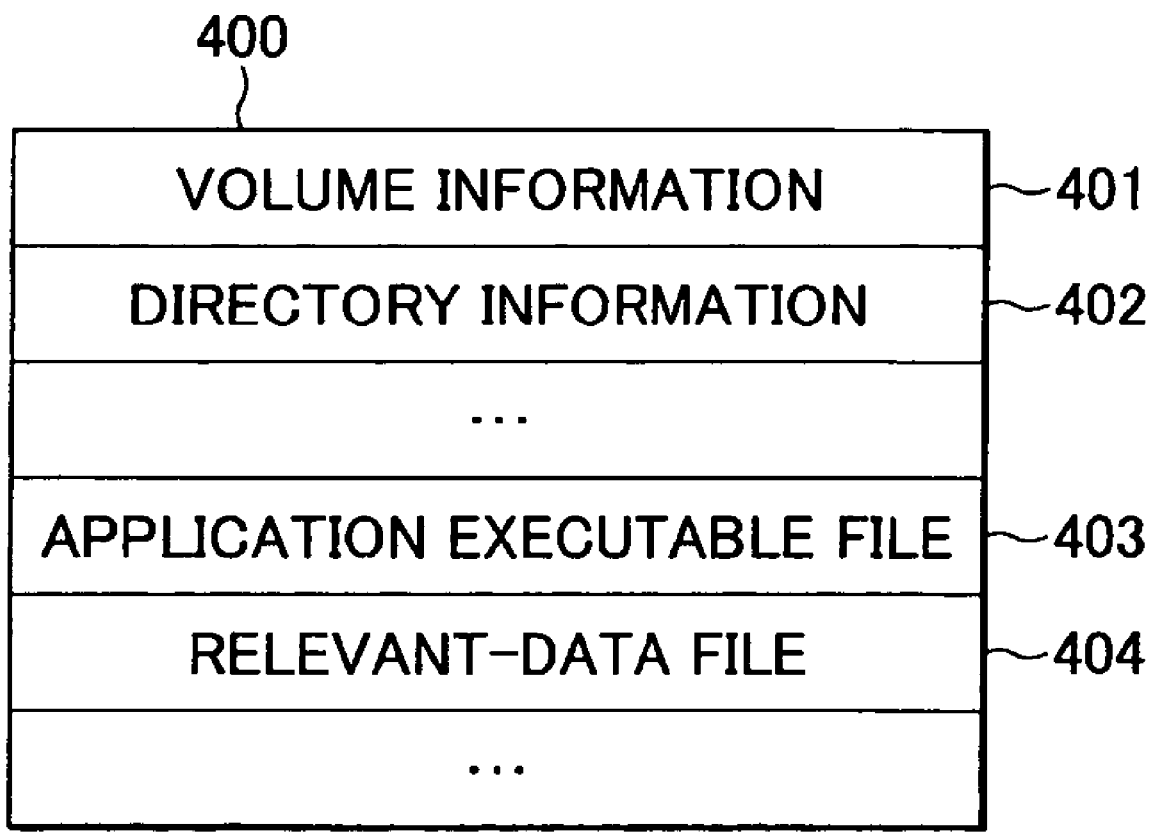
FIG. 4 illustrates a memory map in a state where the job-account-server application program and relevant data are stored in a FD or a CD-ROM in the job account system according to the embodiment of the present invention.

The job-account-server application program 303 and the relevant data 304 are stored on a FD or a CD-ROM to be supplied to the corresponding computer. FIG. 4 illustrates a memory map in a state where the job-account-server application program 303 and the relevant data 304 are stored on a FD or a CD-ROM. A storage area 400 on the FD or the CD-ROM includes volume information 401, directory information 402, an executable file 403 for the job-account-server application program 303, and a relevant-data file 404 of a job account.

This embodiment achieves its effect by loading a storage medium (FIG. 4) on which program codes of the job-account-server application program 303 are stored into the corresponding computer, as shown in FIG. 5, to read and execute the program codes stored in the storage medium with a unit in the computer (the CPU 201).

In order to load the program or the data in FIG. 4 into the corresponding computer, a method is commonly used in which the program or the data stored on a FD 500 is loaded into a computer main unit 502 through a FD drive 501, as shown in FIG. 5. In this method, the program codes themselves that are read from the storage medium realize the function of the above embodiment and the present invention is embodied by the storage medium having the program codes stored therein.

Storage media for supplying the program codes include an optical disc, a magneto-optical disc, a CD-ROM, a CD-R, a magnetic tape, a nonvolatile memory card, and a ROM, in addition to a FD and a HD. Execution of the read program codes by the computer realizes the function of the above embodiment. However, an OS running on the computer or the like may perform all or part of the actual processing based on the program codes to realize the function of the above embodiment through the processing. Furthermore, after the program codes read from the storage medium are written in the memory in an enhancement board that is inserted into the computer or in an enhancement unit that is connected to the computer, a CPU or the like in the enhancement board or the enhancement unit may perform all or part of the actual processing based on the program codes to realize the function of the above embodiment through the processing.

<Control Structure of Image Processing Apparatus>

Figure 6:
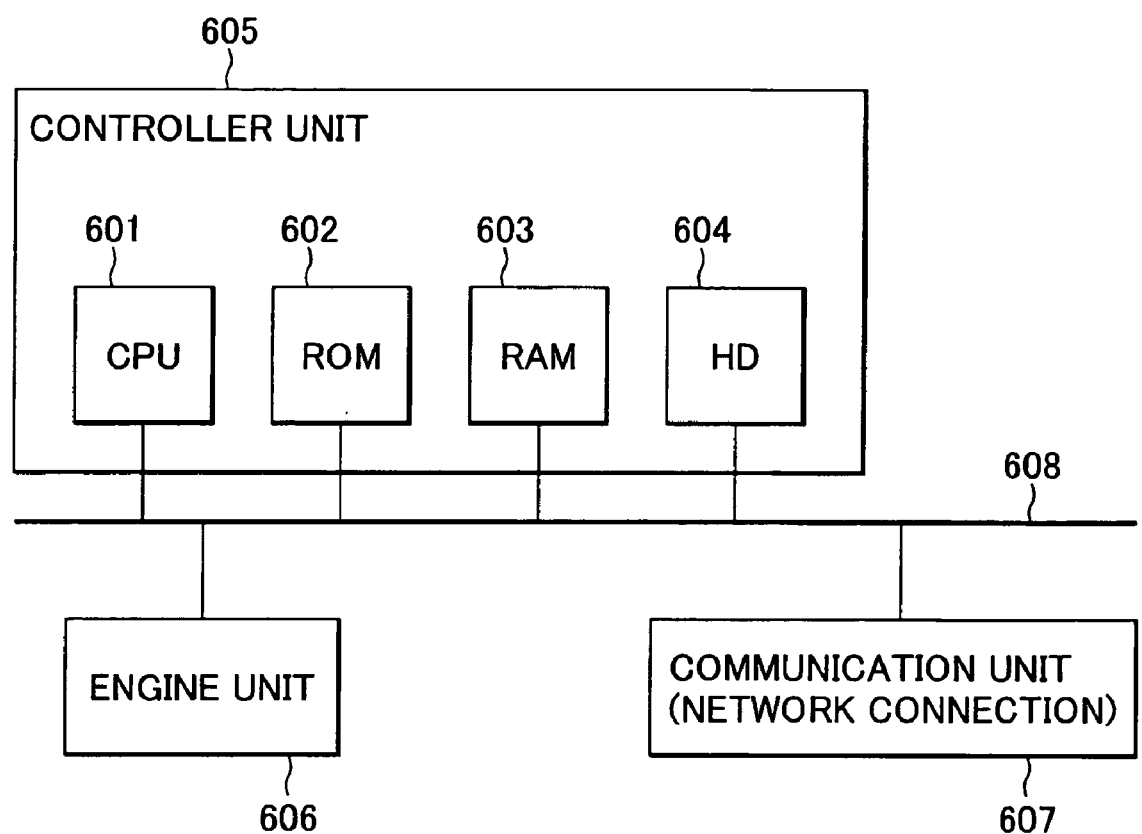
FIG. 6 is a block diagram schematically showing the structure of an image processing apparatus in the job account system according to the embodiment of the present invention.

FIG. 6 is a block diagram schematically showing the structure of the image processing apparatus. A controller unit 605 controls the entire image processing apparatus. The controller unit 605 includes a CPU 601, a ROM 602, a RAM 603, and a HD 604.

The CPU 601 controls the controller unit 605 and the entire image processing apparatus and performs arithmetic processing. The ROM 602 serves as a storage area where information such as a system invocation program is stored. The RAM 603 is a data storage area. The HD 604 can be replaced with other nonvolatile storage units such as a SRAM. The image processing apparatus with a job-history-keeping function stores the job history in the RAM 603 or on the HD 604. An OS, a communication control program, and an engine control program that are stored in the RAM 603 are executed by the CPU 601.

An engine unit 606 of the image processing apparatus performs printing and image-reading operations under the control of the controller unit 605. Specifically, the engine unit 606 is a printer engine or a scanner engine or includes both of a printer engine and a scanner engine.

A communication unit 607 controls network communication. The image processing apparatus can communicate with a client computer or a server computer through the communication unit 607. Data is communicated between the above components through a system bus 608.

<Job Management Process>

Figure 7:
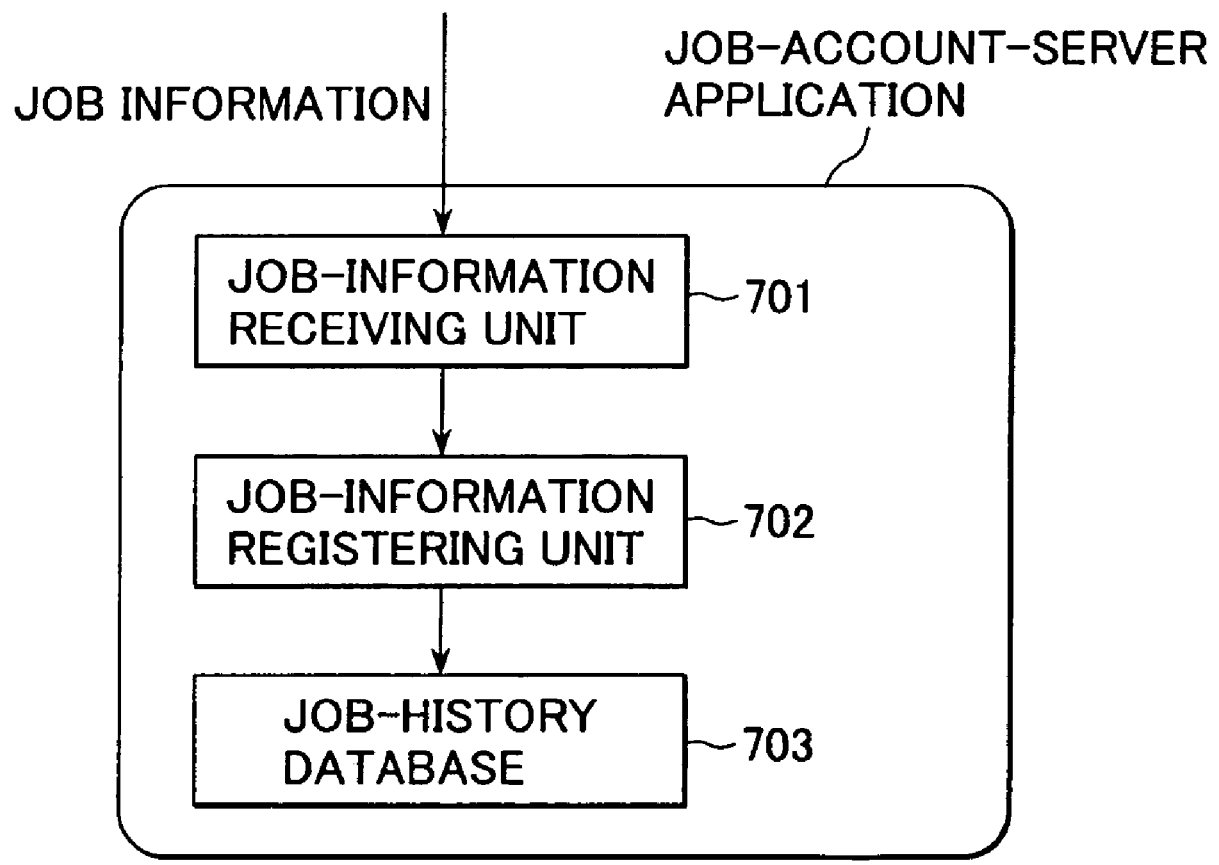
FIG. 7 illustrates the functional structure of a job-information management module in the job account system according to the embodiment of the present invention.

FIG. 7 illustrates the functional structure of the job-information management module 1031c in the job-account-server application 1031. A job-information receiving unit 701 acquires the job information through the network from the job-account-client applications 1014 and 1024, and the printer 1040 and the MFP 1050, which have the job-history-keeping function. A job-information registering unit 702 registers the job information received in the job-information receiving unit 701 in a job-history database 703.

With this structure, it can be determined who has executed how many jobs (the number of pages, the number of output sheets, and the kind of sheet used) with which image processing apparatus and when the jobs are executed by referring to the data in the job-history database 703 for a detailed job account.

<Process by Application>

Figure 8:
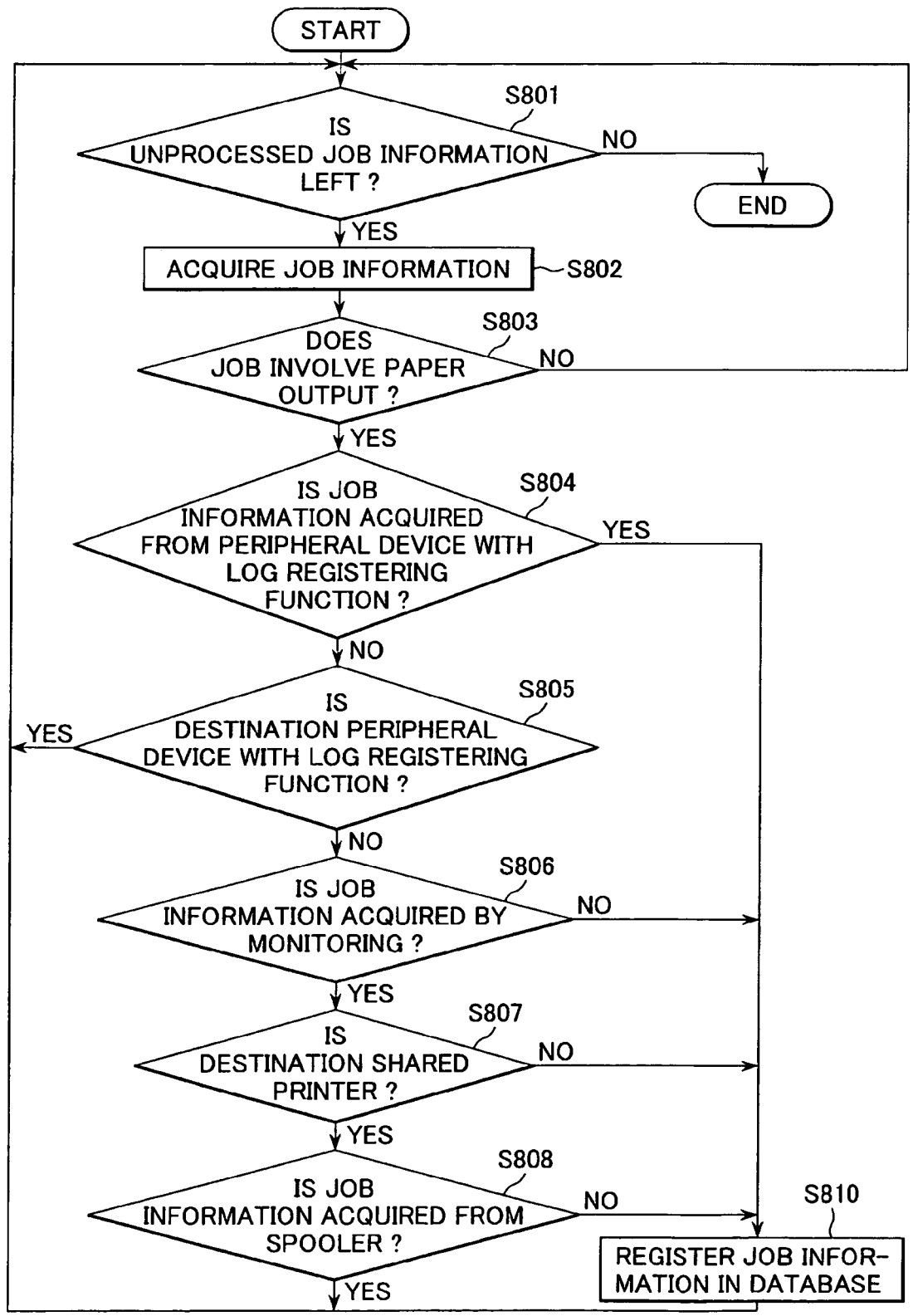
FIG. 8 is a flowchart showing the process for registering job information that is received in a job-information receiving unit in a job-history database by a job-information registering unit, in the job account system according to the embodiment of the present invention.

FIG. 8 is a flowchart showing the process for registering the job information that is received in the job-information receiving unit 701 in the job-history database 703 by the job-information registering unit 702. First, in Step S801, the process determines whether unprocessed job information is left in the job-information receiving unit 701. If no unprocessed job information is left in the job-information receiving unit 701, the process terminates. If unprocessed job information is left, in Step S802, the process acquires the job information from the job-information receiving unit 701. In Step S803, the process determines whether the acquired job information indicates that the corresponding job involves paper output. If the job does not involve paper output, the process returns to Step S801. If the job involves paper output, the process proceeds to Step S804.

Steps from S804 to S808 are performed for registering the job information in the job-history database 703. When the job-account client computer 1020 serves as a print server for the job-account client computer 1010 in FIG. 1, the job information generated in the job-account client computer 1010 may be transmitted from both of the job-account-client applications 1014 and 1024 to the job-account-server application 1031. The job information concerning the same print may be transmitted from both the job-account client computer 1010 and the image processing apparatus with the log-keeping function. Filtering is performed in Steps from S804 to S807 such that the duplicated job information is not registered in the job-history database 703.

In Step S804, the process determines whether the job information is the log information acquired from the image processing apparatus (a peripheral device). If the job information is acquired from the image processing apparatus, the process proceeds to Step S810 to register the job information by priority. This is because the log that is kept as a result of processing in the image processing apparatus is more accurate than the job information transmitted from the job-account client computer before the processing.

If the job information is not acquired from the image processing apparatus, the job information ought to be acquired from the job-account client computer. Accordingly, in Step S805, the process determines whether the destination included in the job information is a peripheral device with a log-registering function. If the destination of the job information is the peripheral device with the log-registering function, it is sufficient to register the job information in a database in the peripheral device upon acquirement of the log information from the peripheral device and, therefore, no registration is performed in this step. Only merging is performed here in order to complement the log information upon registration of the log information from the peripheral device and the process returns to Step S801.

If the destination of the job information is the peripheral device without the log-registering function in Step S805, the process proceeds to Step S806 to determine whether the job information is acquired by monitoring. A method that determines which OS the job information is acquired with is one method for determining whether the job information is acquired by monitoring. It is possible to determine whether the job information is acquired by monitoring based on the kind of OS. For example, when an OS1 is used in the job-account client computer 1010 and an OS2 is used in the job-account client computer 1020, the job information is acquired by monitoring if the job information is acquired with the OS1. If the job information is acquired with the OS2, the job information is acquired from the spooler 1023.

If the job information is not acquired by monitoring in Step S806, there is no possibility of duplicated registration and, therefore, the process proceeds to Step S810 to register the job information. If the job information is acquired by monitoring, in Step S807, the process determines whether the destination of the job involved in the job information is a shared printer. If the destination of the job involved in the job information is not a shared printer, there is no possibility of duplicated registration and, therefore, the process proceeds to Step S810 to register the job information.

If the destination of the job involved in the job information is a shared printer in Step S807, in Step S808, the process determines whether the job information is acquired from the spooler in the client computer (for example, the job-account client computer 1020) serving as a printer server that controls the shared printer. If the job information is not acquired from the spooler, there is no possibility of duplicated registration and, therefore, the process proceeds to Step S810 to register the job information.

If the job information is acquired from the spooler in Step S808, the process determines that the job information is duplicated because both the job information acquired by monitoring and the job information acquired from the spooler are output to the shared printer, and the process returns to Step S801.

In Step S810, the process registers the job information in the job-history database 703.

FIG. 9 is an example of job information registered in the job-history database 703. The job-history database 703 has items and settings for the respective items. An item 901 indicates an output device for the job, that is, which image processing apparatus the job is processed in. When the job does not involve paper output, a file name (scanning of a document), fax transmission, or a job involving no paper output is stored in the job-history database 703.

An item 902 indicates a method for acquiring the job information. Methods for acquiring the job information include acquirement by monitoring, acquirement from a spooler, and acquirement by using the job-history-keeping function.

An item 903 indicates the start or end time of the job. An item 904 indicates the kind of output sheet. An item 905 indicates the number of output pages. An item 906 indicates the number of copies. An item 907 indicates whether the job from the client computer is supplied to a shared printer. An item 908 indicates the name of a user who has issued the job. An item 909 indicates whether the job is printed in a color mode or in a monochrome mode.

<Flow of Printing Job>

Figure 10:
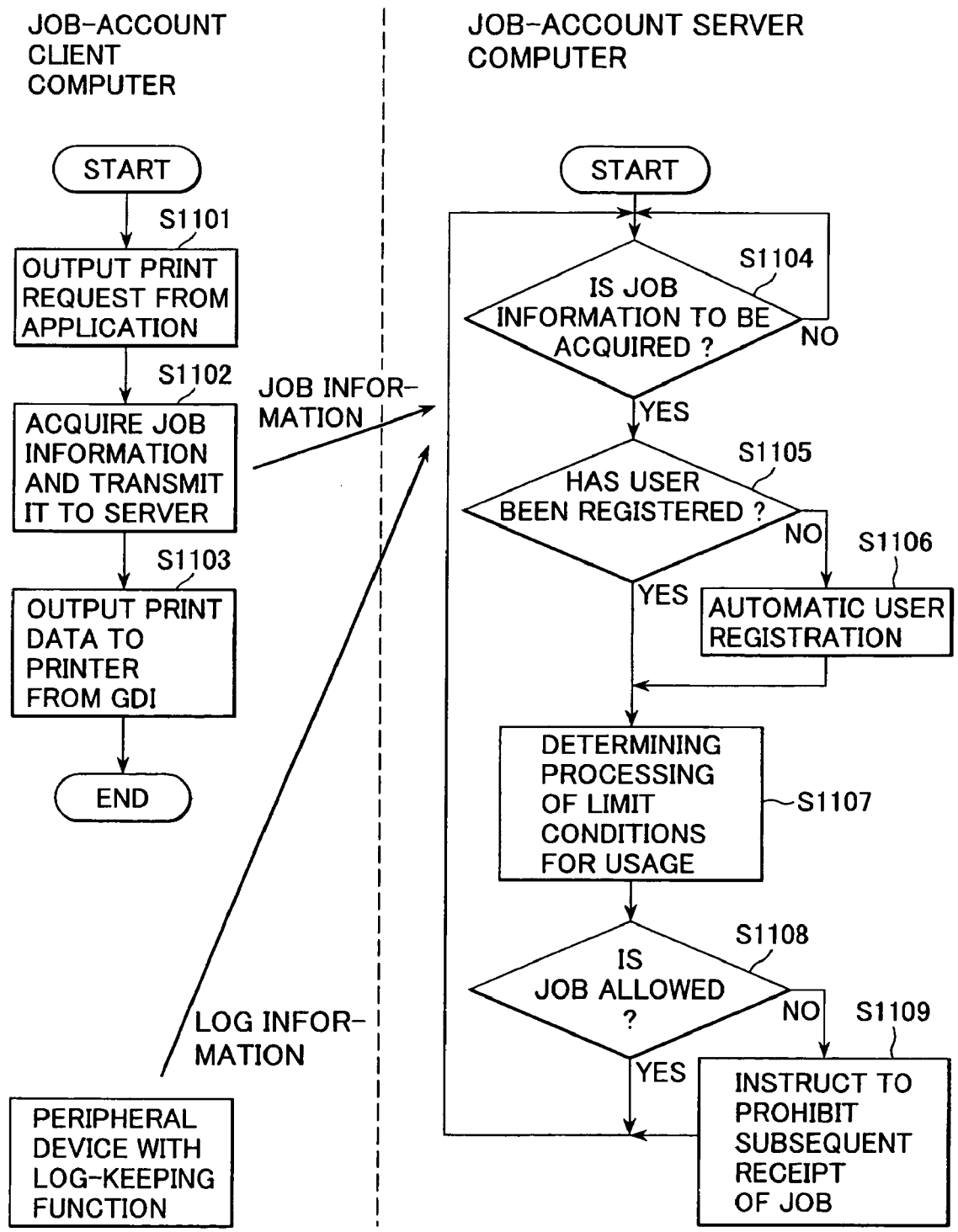
FIG. 10 includes flowcharts showing the processes performed in a job-account server computer and a job-account client computer.

FIG. 10 includes flowcharts showing the processes performed in the job-account client computer 1010 and the job-account server computer 1030.

In the job-account client computer 1010, when the user instructs the application 1011 in the job-account client computer 1010 to perform printing, in Step S1101, the application 1011 edits a document or an image in accordance with the instruction by the user to output a print request. In Step S1102, the job-account-client application 1014 acquires the print request from the application 1011 (or monitors the print request in the application 1011) to determine the content of the print request and acquires the determined result as job information. The job information is transmitted to the job-information management module 1031c in the job-account server computer 1030.

In Step S1103, the GDI 1012 receives the print request from the application 1011 and outputs the received print data to a printer such as the printer 1040 through the spooler 1013.

In the job-account server computer 1030, in Step S1104, the process determines whether the job-information management module 1031c is to acquire the job information from the job-account client computer 1010 or the log information from the image processing apparatus. After the process determines whether the acquired information is to be registered in the job-history database 703, as shown in FIG. 8, the process proceeds to Step S1105 if the acquired information is to be registered in the job-history database 703. In Step S1105, the process determines, based on the job information, whether the user who issued the job information has already been registered in the job-account-server application 1031. If the user has not been registered in the job-account-server application 1031, the process proceeds to Step S1106 to automatically perform the user registration with the user information included in the job information. After the automatic user registration is completed in Step S1106, the process performs the subsequent steps to Step S1106 in accordance with the upper limit set in Step S1504 in FIG. 15. The process may return to Step S1104 after Step S1106 without performing the subsequent steps to Step S1106.

Figure 15:
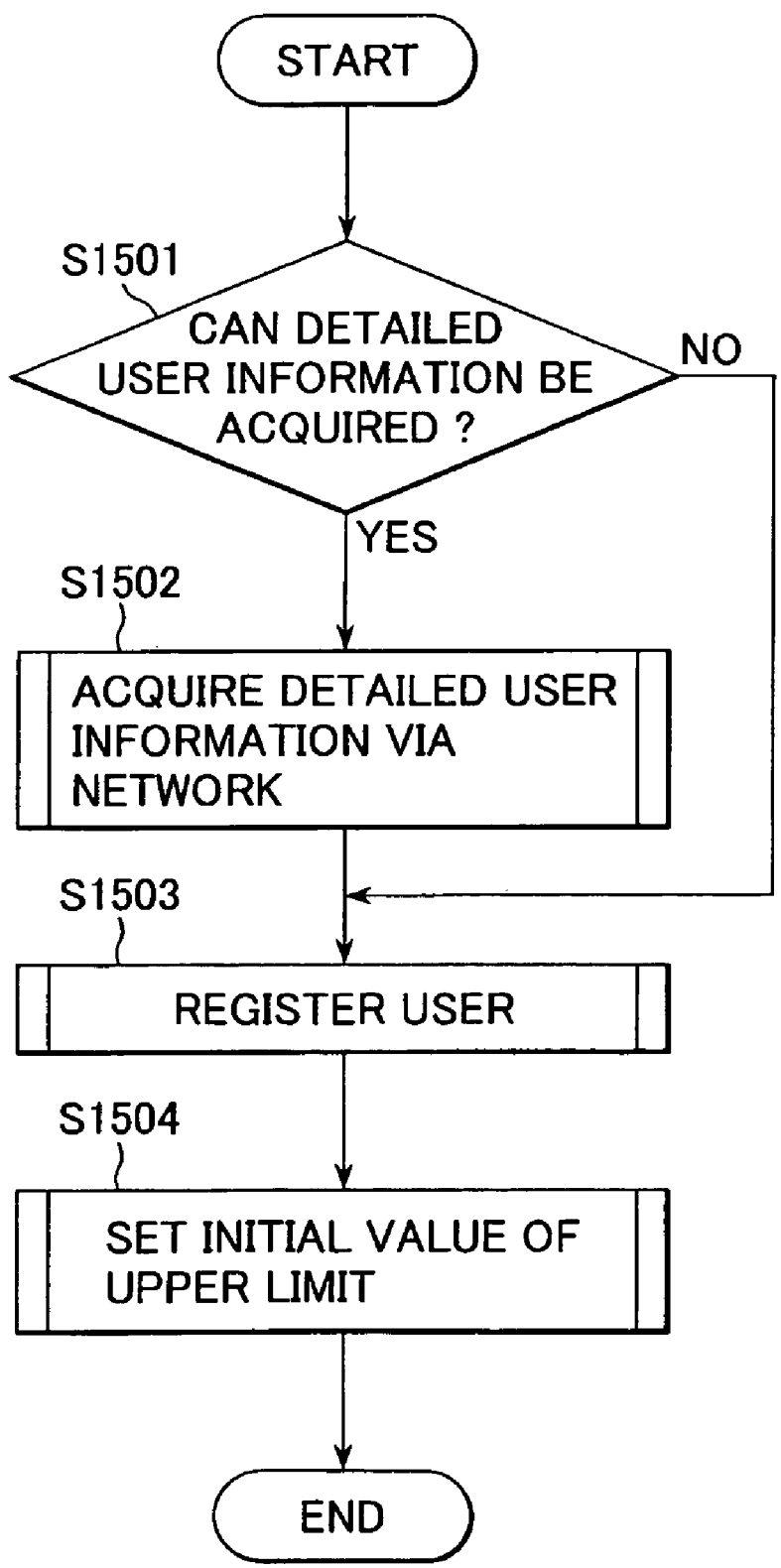
FIG. 15 is a flowchart showing a process for registering an unregistered user in the job-history database by the job-information registering unit, in the job account system according to the embodiment of the present invention.

FIG. 15 is a flowchart showing a provisional registration process depicted in Step S1106. In Step S1501, the process determines whether the detailed user information can be acquired from an external server (not shown) that manages the registration information concerning the user in the first meaning described above (system user). The detailed user information may be the same as the user name that is, for example, registered in a domain of a Windows® system or may be a name in a user database or user-specific information such as an e-mail address. If the detailed user information can be acquired in Step S1501, in Step S1502, the process acquires the detailed user information. In the user registration in Step S1503, the process automatically appends the detailed user information to perform the registration of the user in the second meaning. Meanwhile, in Step S1502, the process further acquires the detailed information including the name or identification information of a group to which a user having a system user ID that is the same as the job account ID belongs. Print limit information that can be set in the job-account server computer 1030 may be included in the information acquired in Step S1502.

Figure 18:
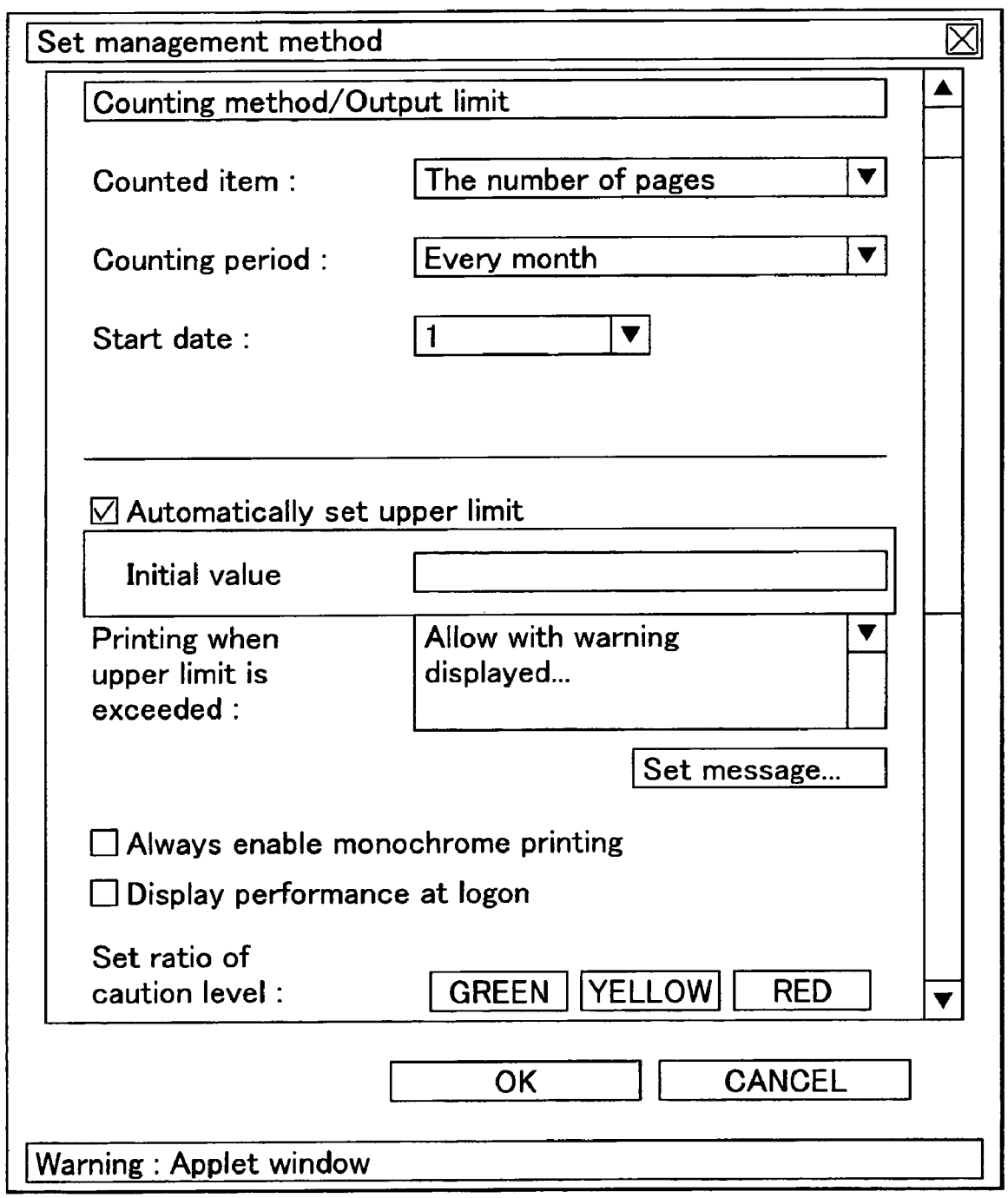
FIG. 18 illustrates a screen in which the initial value of an upper limit is set, in the job account system according to the embodiment of the present invention.

If the process determines that the detailed user information cannot be acquired in Step S1501, the process proceeds to Step S1503 to perform the user registration without appending the detailed user information. After acquiring the initial value of the upper limit that has been stored in advance in the job-account server computer 1030, the process proceeds to Step S1504 to set the initial value of the acquired upper limit in the user information. The initial value of the upper limit can be set in a screen as shown in FIG. 18.

Referring to FIG. 10, if the process determines in Step S1105 that the user is the registered user in the second or third meaning who has been registered in the job-account server computer 1030, the process proceeds to Step S1107 to perform determining processing of limit conditions for usage. For example, the process determines whether the total number of printed pages exceeds the maximum number of pages that is set. In Step S1108, the process determines whether the job is allowed. If the job is allowed, the process returns to Step S1104. If the job is not allowed, the process proceeds to Step S1109. In Step S1109, the process instructs the image processing apparatus or the job-account client computer 1010, or both the image processing apparatus and the job-account client computer 1010 to prohibit the subsequent receipt of the job and returns to Step S1104. If the initial value of the upper limit is set to zero in the automatic registration, the process determines to impose limitations on usage in Step S1107 immediately after the automatic registration and prohibits the receipt of the job.

In this manner, as long as a user is registered in a network system, the user is not fully prohibited to perform printing and he/she is allowed to perform printing until the job reaches a certain amount even if the user is a provisionally registered user who has not been registered in the job account system in the second meaning described above. However, the user is not allowed to perform printing without limitation, thus allowing the job account system to operate flexibly while ensuring its security.

Figure 11:
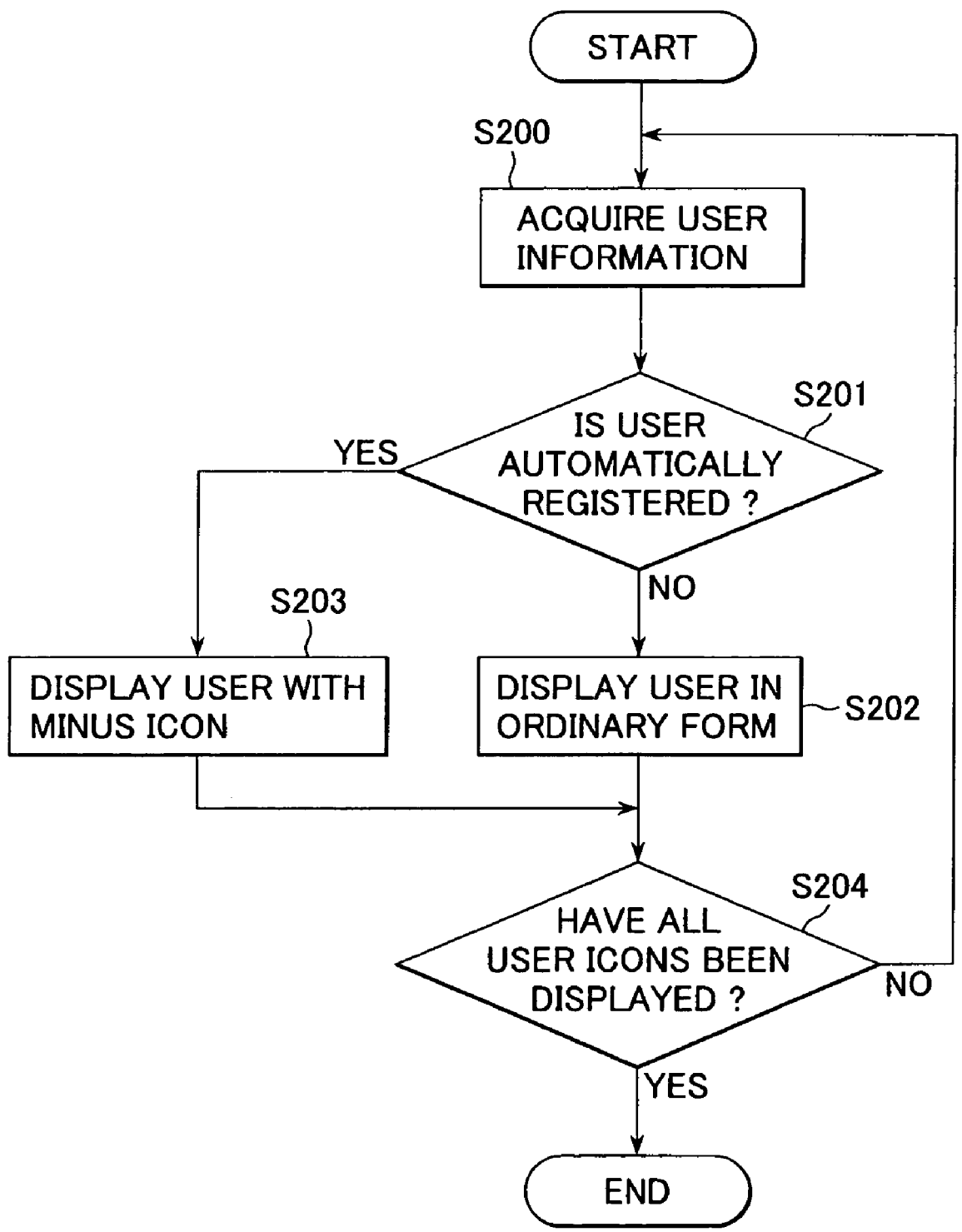
FIG. 11 is a flowchart illustrating a process for displaying a user icon in the job-account server computer.

FIG. 11 is a flowchart illustrating a process for displaying an icon for the user who has been registered in the above process. The job-account-server application 1031, which is a preferred example of display control means, performs the processes shown in FIGS. 8, 10, 11, 15, and 16 with the CPU 201, and displays the dialog boxes or screens shown in FIGS. 12 to 14 and 18, for example, in the CRT 205, which is the display of the job-account server computer 1030 in FIG. 2, based on the results of the processes. Or, display control information including the above dialog boxes or screens may be transmitted from the job-account server computer 1030 to an external computer such as the job-account client computer 1020 to display the transmitted information in a CRT or a liquid crystal panel.

In Step S200, the process acquires the user information from the user information database in the job-account server computer 1030. In Step S201, the process determines whether the acquired user information is set by the manager with the user-information management module 1031a. If the acquired user information is set by the manager with the user-information management module 1031 (is not automatically registered), in Step S202, the user is displayed in an ordinary form, like the user icon 1201 in FIG. 12. If the user is only automatically registered, in Step S203, the user is displayed with the minus icon, like the user icon 1202 in FIG. 12.

Until it is determined in Step S204 that all the user icons are displayed, steps S200 to S203 are repeated.

Modifications of the above embodiments will now be described with reference to FIGS. 16 and 17.

Figure 16:
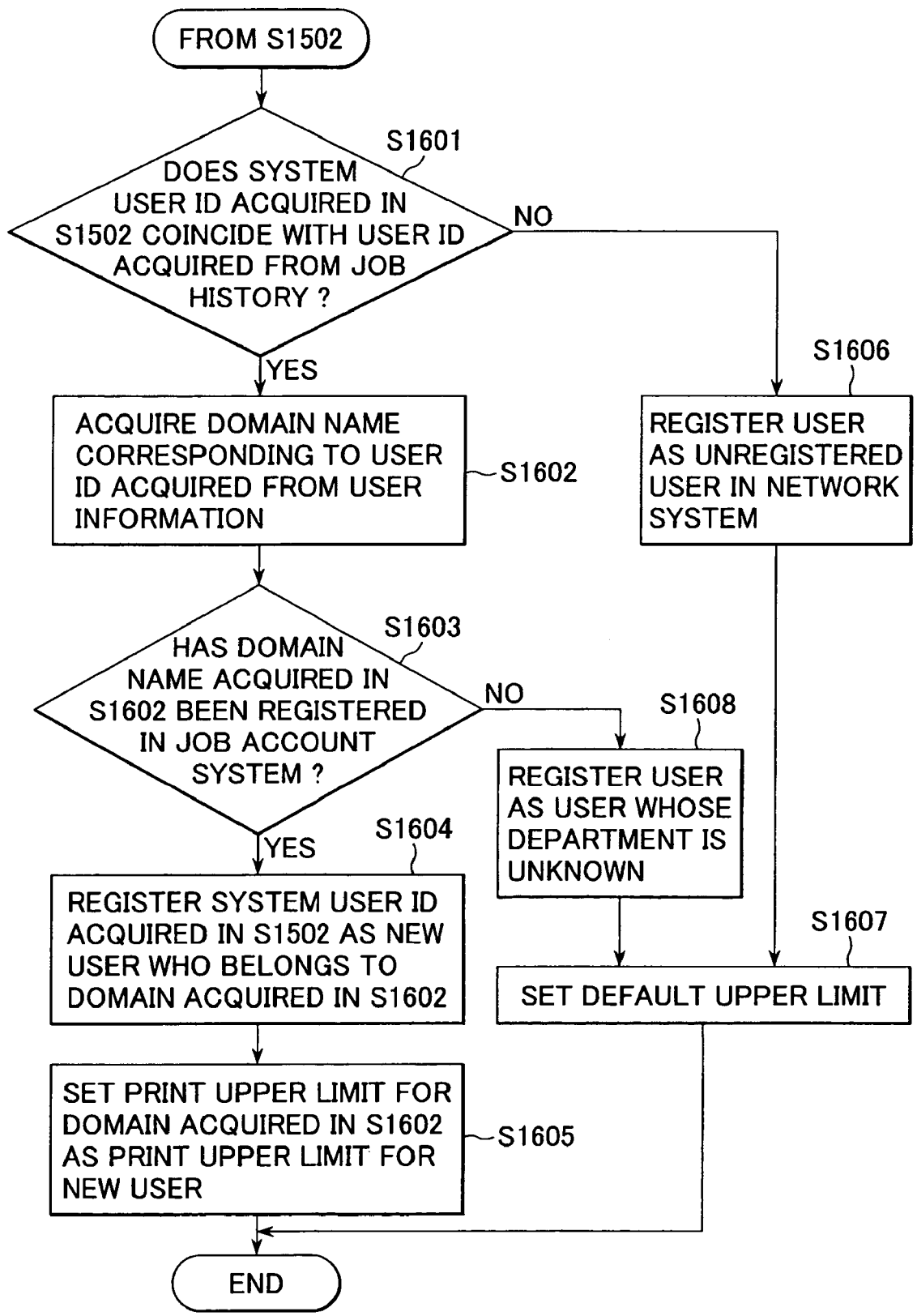
FIG. 16 is a flowchart showing a modification of the process in FIG. 15.

FIG. 16 is a flowchart showing a modification process of part of the process in FIG. 15. The steps shown in FIG. 16 follow Step S1502 in FIG. 15 and correspond to modifications of Step S1503 and Step S1504. Hence, the steps until Step S1502 are performed in the same manner as in FIG. 15. Referring to FIG. 16, in Step S1601, the process determines whether the system user ID in the detailed user information acquired via a network in Step S1502 coincides with the user ID (also referred to as a job-account user ID) acquired from the job history, which is a preferred example of image-processing-apparatus user identification information. If the system user ID coincides with the job-account user ID, the process proceeds to Step S1602. If the system user ID does not coincide with the job-account user ID, the process proceeds to Step S1606 because the user corresponding to the job-account user ID is an unregistered user in the network system. In Step S1606, the process registers the user as an unregistered user in the network system and proceeds to Step S1607. In Step S1607, since other information, such as the department to which the user belongs, is unknown, the user information managed by an unknown job account is left blank or is filled with a default value. Here, the process sets a default upper limit that can be set in advance for the unregistered user and proceeds to the next step. Meanwhile, Steps S1606 and S1607 following Step S1601 may be defined as separate steps that are independent of Step S1608. In such a case, the job-account-server application 1031 may detect that an unknown user who is not recognized by the system has instructed printing and then may record the detected result in the history. Then, after the printing upper limit for the unknown and unregistered user is set to zero in the job-account-server application 1031, mail may be sent to an external management apparatus (now shown).

In Step S1602, the process acquires the name of a domain to which the job-account user ID belongs from among the user information managed by the user-information management module 1031a in the job-account-server application 1031. The system user ID is a network ID necessary for using network resources. The system user ID is a preferred example of system user identification information and includes identification information such as letters and/or numbers. A group on the network to which the system user ID belongs is referred to as the domain here. If the system user ID belongs to a group A, which is the domain, the system user can use a storage service or printer resource in the group A. The number of output sheets from a printer and so on is managed by the job-account server computer 1030. In Step S1603, the process determines whether the domain name acquired in Step S1602 has already been registered in the user-information management module 1031a in the job-account server computer 1030 and managed by the user-information management module 1031a. If the process determines that the domain name has already been registered in the user-information management module 1031a and belongs to the group A, the process proceeds to Step S1604. In Step S1604, the process registers the system user ID acquired in Step S1502 as a new user who belongs to the group A having the domain name acquired in Step S1602. The registered user is displayed so as to belong to the group A with a user name bbb, as shown in FIG. 17 described in detail below. Although the user name bbb is recognized as belonging to the group A on the network system, it has not been registered in the job-account server computer 1030 as a job account user, which is a preferred example of the image-processing-apparatus user. Accordingly, the user name bbb is displayed with the minus icon. If the process recognizes in Step S1603 that a group B is registered in the network system as a system group, an image-processing-apparatus user ID xxx coincides with a system user ID xxx, and the system user ID xxx belongs to the group B, the group to which a user belongs is distinguishably displayed and the registration state in the job account system is also identifiably displayed in the same screen with icons, as shown in FIG. 17.

In this manner, the process can confirm in advance which user in which department tries to perform printing when a plurality of unregistered users in the job account system who belong to different departments starts to perform printing. In Step S1605, the process sets the print upper limit for the domain acquired in Step S1602 as a print upper limit for the new user. Accordingly, a certain print limit value that has been set for the corresponding department in advance can be automatically set for the user corresponding to the job account user ID extracted from the job history. Also, the number of pages printed by unregistered users can be counted by department and the counted values can be managed for every department. Furthermore, when an IT manager is assigned for every department, the IT manager in each department can recognize unregistered users in the job account system of the department which he/she is in charge of only by checking the display as shown in FIG. 17. As in the above embodiment, for example, information that could not be acquired in Step S1502, among the user information of the unregistered users, can be modified or input with the screen for editing user information in FIG. 13 or 14.

Figure 17:
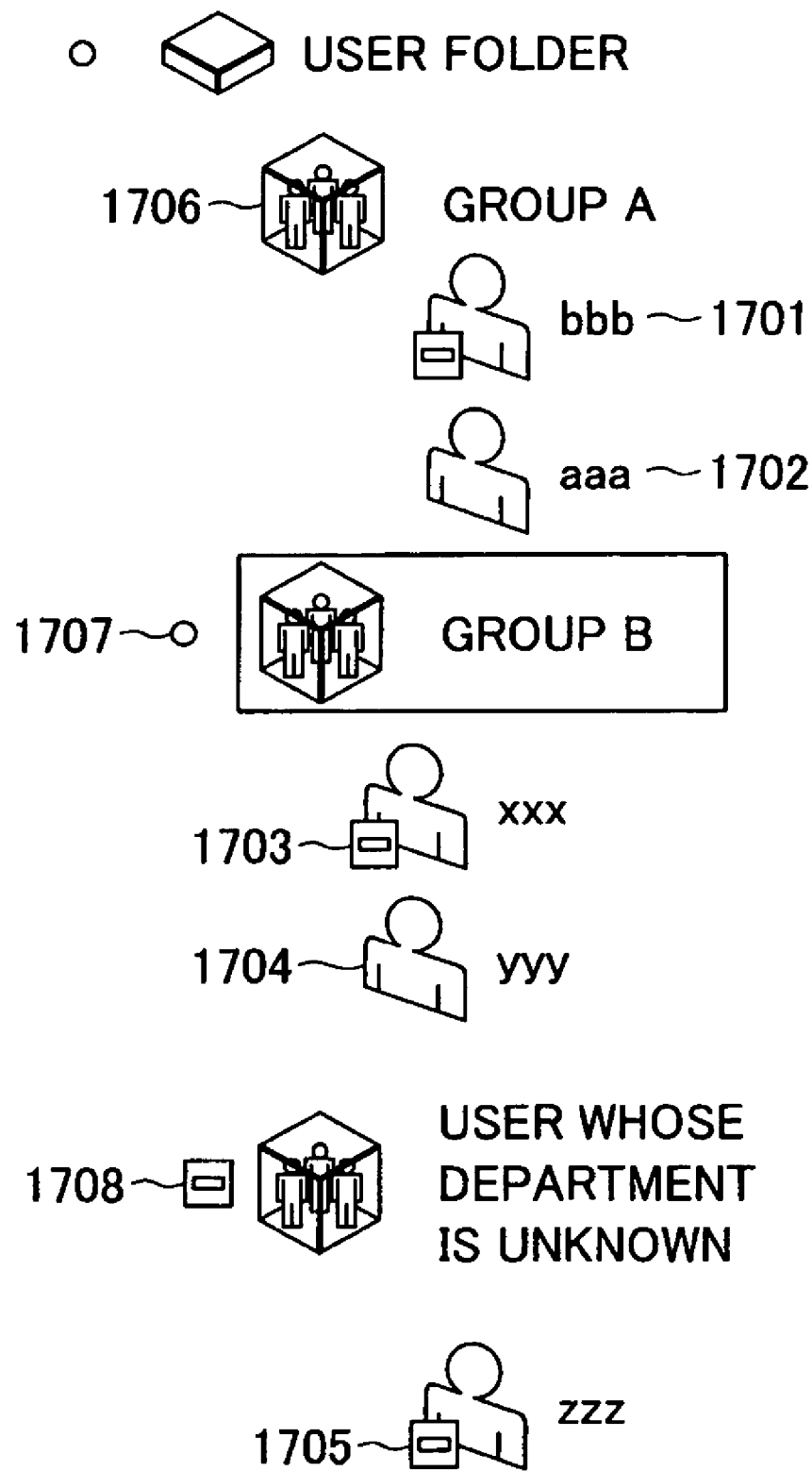
FIG. 17 is a diagram showing a modification of the screen in FIG. 12.

FIG. 17 is a diagram showing a modification of the screen in FIG. 12.

An icon 1706 illustrates a group A. An icon 1701 illustrates a job account user bbb who belongs to the group A. An icon 1702 illustrates a job account user aaa who belongs to the group A. A minus icon appended to the icon 1701 indicates an unregistered user.

An icon 1707 illustrates a group B. Icons 1703 and 1704 illustrate job account users xxx and yyy, respectively, who belong to the group B.

An icon 1708 illustrates a group for users whose departments are unknown, including users whose groups have not been registered in the job account system and users whose groups are set in neither the network system nor the job account system. An icon 1705 illustrates a user zzz whose department is unknown. If another new user www whose department is unknown is registered, an icon (not shown) corresponding to the user www is displayed below the icon 1705. Since the user is not registered in the job account system, the minus icon is appended to the icon illustrating the user www. Although the users whose departments are unknown are collectively displayed, the users whose groups have not been registered in the job account system may be distinguished from the users whose groups are registered in neither the network system nor the job account system for display (not shown).

The job-account-server application 1031 controls the process for identifying a newly registered user as a user who belongs to a group that is a management target for the print history information, which is an example of the log information, and as a new user for the group to display the identified user in the display.

When the job-account-server application 1031 determines that the group that is the management target for the print history information, namely, the group that is the domain acquired in advance from the print history information by the job-account-server application 1031 does not coincide with the system group to which the system user who has been registered in the network system belongs, the job-account-server application 1031 controls the process for displaying the job account user so as to be identified as a job account user whose group is unknown. The display control processes described above may be performed in one module in the job-account-server application 1031 or in two separate modules therein.

The embodiments of the present invention described above may be applied to a system including a plurality of apparatuses (for example, a host computer, an interface device, a reader, a printer, and so on) or to an apparatus (for example, a copier, a facsimile machine, or the like) including one unit.

The job-account-server application 1031, which is included in the job-account server computer 1030 that manages the usage of the image processing apparatus, such as the printer 1060, the MFP 1050, or a scanner (not shown), and which is an example of management means for managing the print history information that indicates the usage of, for example, the printer 1060, registers a printer user ID identifying the user who is the management target for print history information managed by the job-account server computer 1030. The job-account-server application 1031 acquires the limit value of an amount used that has been stored in advance in response to the registration of the job account ID and automatically sets the acquired limit value as the limit value of the number of prints for the printer user. Furthermore, the job-account-server application 1031 acquires system user information from an external server that manages the system users registered in the network system. The job-account-server application 1031 includes determination means for determining whether the system user ID extracted from the acquired system user information coincides with the job account user ID extracted from the log information (print history and output history) that is acquired from the printer and managed by the job-account server computer 1030. If the job-account-server application 1031 determines that the system user ID coincides with the job account user ID, the job-account-server application 1031 automatically sets the limit value acquired by the job-account server computer 1030 as the limit value of the number of prints for the job account user ID.

If the job-account-server application 1031 determines that the extracted system user ID coincides with the job account user ID, the job-account-server application 1031 automatically sets the limit value of the number of prints as the limit value of a usage fee for the job account user. If the job-account-server application 1031 determines that the extracted system user ID does not coincide with the job account user ID, the job-account-server application 1031 sets the job-account server computer 1030 not to allow the user corresponding to the user name acquired from the print history information to use the image processing apparatus. The limit value of the usage fee for a printer or an MFP includes the limited number of prints (the limited number of outputs) that can be set for both the color printing and the monochrome printing. The limit value of the usage fee for a scanner includes the number of times when scanning is performed (the limited number of read documents), or the limit value or upper limit of the number of times when image processing is performed with an image processing program, which is available after the reading by using the scanner, (for example, the number of invocations of the image processing program).

Although only a case in which printing with the image processing apparatus such as the printer, the copier, or the MFP is limited is described in the above embodiment, the present invention is not limited to this case. The present invention can also be applied to a case in which the usage limit is set or the usage fee is charged for the image processing apparatus such as the scanner. Namely, the limited number of sheets scanned with the scanner can be set. An information processing server that can also set processing performed when scanning exceeding the limited number of scanned sheets is required (for example, scanning prohibiting processing or warning processing) is within the scope of the present invention.

The present invention has three aspects. One aspect is to improve the security level of a printing system. Another aspect is to automatically reflect the registration information in the first meaning, that is, the system user information registered in a network system such as a domain, on the user information registered in the job account system in the second meaning and to set the limit value of printing by department. Still another aspect is to distinguishably display such registration states in a display with icons. It is to be understood that the present invention is not limited to the above embodiments and the present invention is embodied for achieving at least one of the aspects. Embodiments that cannot concurrently achieve all the above aspects are, of course, within the scope of the present invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing apparatus for managing usage of an image processing apparatus, the information processing apparatus comprising:
   a managing unit for managing log information that indicates the usage of the image processing apparatus;
   a registering unit for registering image-processing-apparatus user information concerning an image-processing-apparatus user in the log information managed by the managing unit;
   a first acquiring unit for acquiring a limit value of an amount used that is input in response to the registration of the image-processing-apparatus user information by the registering unit;
   a setting unit for automatically setting the limit value acquired by the first acquiring unit as a limit value of a usage fee for the image-processing-apparatus user;
   a second acquiring unit for acquiring, from an external information processing apparatus that manages a system user registered in a network system, information indicating a system group to which the system user belongs; and
   a decision unit for deciding whether a group that is a management target for the log information managed by the managing unit coincides with the system group based on the information acquired by the second acquiring unit,
   wherein, when the decision unit decides that the group that is the management target for the log information coincides with the system group, the registering unit registers the image-processing-apparatus user as a new user who belongs to the group that is the management target for the log information.

2. An information processing apparatus according to claim 1, further comprising:
   wherein the second acquiring unit for acquires system user information from the external information processing apparatus that manages the system user registered in the network system; and further comprising:
   an extracting unit for extracting system user identification information from the system user information acquired by the second acquiring unit and for extracting image-processing-apparatus user identification information concerning the image-processing-apparatus user from the log information managed by the managing unit; and
   a determining unit for determining whether the system user identification information extracted by the extracting unit coincides with the image-processing-apparatus user identification information,
   wherein, when the determining unit determines that the system user identification information extracted by the extracting unit coincides with the image-processing-apparatus user identification information, the setting unit automatically sets an output limit value acquired by the second acquiring unit as the limit value of the usage fee for the image-processing-apparatus user.

3. An information processing apparatus according to claim 2, wherein, when the determining unit determines that the system user identification information extracted by the extracting unit coincides with the image-processing-apparatus user identification information, the setting unit automatically sets the limit value acquired by the first acquiring unit as the limit value of the usage fee for the image-processing-apparatus user and, when the determining unit determines that the system user identification information does not coincide with the image-processing-apparatus user identification information, the setting unit sets the information processing apparatus not to allow a user of the image-processing-apparatus user identification information to use the image processing apparatus.

4. An information processing apparatus according to claim 1, further comprising a first display controlling unit for controlling a process of identifying a new user registered by the registering unit as a user who belongs to the group that is the management target for the log information and as a new user for the group to display the identified user in a display.

5. An information processing apparatus according to claim 1, wherein, when the decision unit decides that the group that is the management target for the log information does not coincide with the system group to which the system user belongs, the managing unit includes a second display controlling unit for controlling a process of identifying the image-processing-apparatus user as an image-processing-apparatus user whose group is unknown to display the identified user.

6. An information processing method for managing usage of an image processing apparatus, the information processing method comprising:
   a management step for managing log information that indicates the usage of the image processing apparatus;
   a registering step for registering image-processing-apparatus user information concerning an image-processing-apparatus user in the log information managed in the managing step;
   a first acquiring step for acquiring a limit value of an amount used that is input in response to the registration of the image-processing-apparatus user information in the registering step;
   a setting step for automatically setting the limit value acquired in the first acquiring step as a limit value of a usage fee for the image-processing-apparatus user;
   a second acquiring step for acquiring, from an external information processing apparatus that manages a system user registered in a network system, information indicating a system group to which the system user belongs; and
   a decision step for deciding whether a group that is a management target for the log information managed in the managing step coincides with the system group based on the information acquired in the second acquiring step,
   wherein, when the decision step decides that the group that is the management target for the log information coincides with the system group, the registering step registers the image-processing-apparatus user as a new user who belongs to the group that is the management target for the log information.

7. An information processing method according to claim 6, wherein the second acquiring step acquires system user information registered in the network system; and further comprising:
   an extracting step for extracting system user indentification information from the system user information acquired in the second acquiring step and for extracting image-processing-apparatus user identification information concerning the image-processing-apparatus user from the log information managing step; and
   a determining step for determining whether the system user identification information extracted in the extracting step coincides with the image-processing-apparatus user identification information,
   wherein, when the determining step determines that the system user identification information extracted in the extracting step coincides with the image-processing-apparatus user identification information, the setting step automatically sets an output limit value acquired in the second acquiring step as the limit value of the usage fee for the image-processing-apparatus user.

8. An information processing method according to claim 7 wherein, when the determining step determines that the system user identification information extracted in the extracting step coincides with the image-processing-apparatus user identification information, the setting step automatically sets the limit value acquired in the first acquiring step as the limit value of the usage fee for the image-processing-apparatus user and, when the determining step determines that the system user identification information does not coincide with the image-processing-apparatus user identification information, the setting step sets the information processing apparatus not to allow a user of the image-processing-apparatus user identification information to use the image processing apparatus.

9. An information processing method according to claim 6, further comprising a first display controlling step for controlling a process of identifying a new user registered in the registering step as a user who belongs to the group that is the management target for the log information and as a new user for the group to display the identified user in a display.

10. An information processing method according to claim 6 wherein, when the decision step decides that the group that is the management target for the log information does not coincide with the system group to which the system user belongs, the managing step includes a second display controlling step for controlling a process of identifying the image-processing-apparatus user as an image-processing-apparatus user whose group is unknown to display the identified user.

11. A computer-readable medium storing a control program performing information processing that manages usage of an image processing apparatus, the control program causing a computer to execute:
   a management step for managing log information that indicates the usage of the image processing apparatus;
   a registering step for registering image-processing-apparatus user information concerning an image-processing-apparatus user in the log information managed in the managing step;
   a first acquiring step for acquiring a limit value of an amount used that is input in response to the registration of the image-processing-apparatus user information in the registering step;
   a setting step for automatically setting the limit value acquired in the first acquiring step as a limit value of a usage fee for the image-processing-apparatus user;
   a second acquiring step for acquiring, from an external information processing apparatus that manages a system user registered in a network system, information indicating a system group to which the system user belongs; and
   a decision step for deciding whether a group that is a management target for the log information managed in the managing step coincides with the system group based on the information acquired in the second acquiring step,
   wherein, when the decision step decides that the group that is the management target for the log information coincides with the system group, the registering step registers the image-processing-apparatus user as a new user who belongs to the group that is the management target for the log information.

* * * * *